Figure 1:
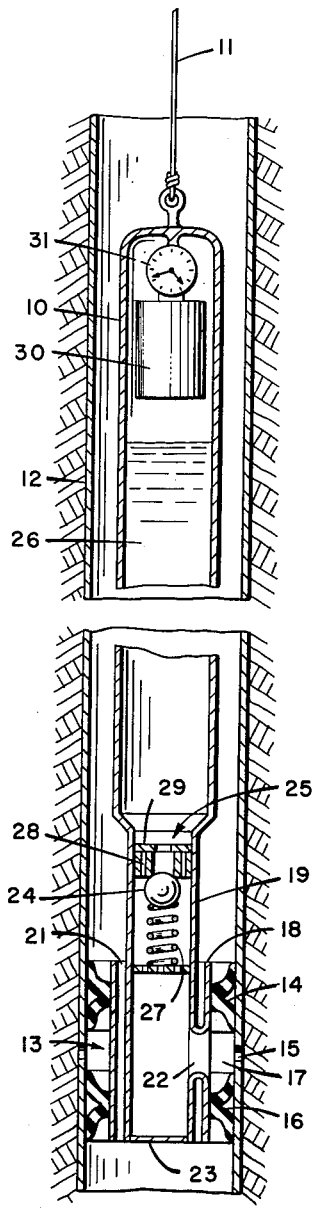

May 8, 1962 — C. R. FAST ETAL — 3,033,286
TESTING EARTH FORMATIONS
Filed Aug. 12, 1959

CLARENCE R. FAST
GEORGE C. HOWARD
INVENTORS

BY C. Goodwin

United States Patent Office 3,033,286
Patented May 8, 1962

3,033,286
TESTING EARTH FORMATIONS
Clarence R. Fast and George C. Howard, Tulsa, Okla., assignors to Pan American Petroleum Corporation, Tulsa, Okla., a corporation of Delaware
Filed Aug. 12, 1959, Ser. No. 833,357
20 Claims. (Cl. 166—3)

This invention relates to the testing of wells. More particularly, this invention pertains to an improved method and apparatus for making a true test of the productivity of formations encountered during the drilling of a well.

During the drilling of wells, particularly oil and gas wells drilled by the rotary method, it is now a well established practice to test the nature and quantity of fluids produced by formations penetrated by the drill while the drilling fluid is in the well. This test is commonly referred to as a "drill stem test." A major difficulty and shortcoming of the drill stem test as it is now practiced is that the test is often considered inaccurate and not representative of the true productivity of a formation, particularly a formation which is relatively tight, i.e., those formations which require some form of stimulation to make them productive. Many formations contain substantial quantities of oil and gas but their permeabilities are so low, e.g., 1–10 millidarcies, that on a typical drill stem test they are considered non-productive or not commercially productive. That is, the drill stem test in this type of formation is not directly indicative of the productivity of the formation. In such cases, productive formations are often bypassed as drilling proceeds and the well is either completed in another formation or abandoned.

Figure 2:
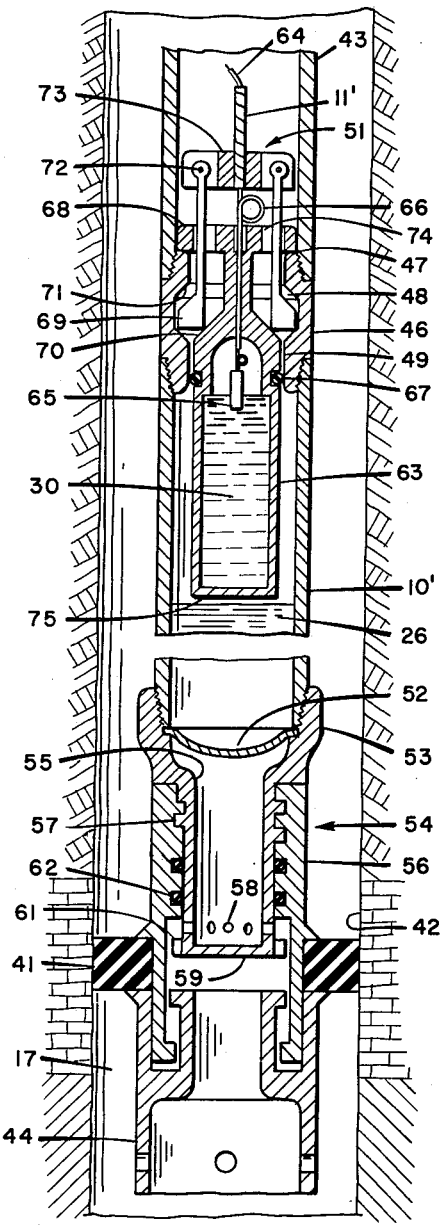

It is an object of this invention to provide a method and apparatus for determining the true productivity of a formation, i.e., the nature of the fluid and an indication of the quantity of fluid which that formation will produce when the well is finally completed by regular well completion procedures. It is a more specific object of this invention to provide a method and apparatus wherein a formation encountered during rotary drilling can be stimulated and then tested to determine the nature of the fluids therein and the quantity of fluids produced therefrom in the course of drilling, i.e., while the drilling fluid is in the hole and in many cases before the casing is set in the hole. It is still a more specific object of the invention to provide an improved method and apparatus by which formations encountered during the drilling process may be isolated from the main body of the drilling fluid in a well, fractured, acidized, or otherwise stimulated; and then while the formation is maintained thus isolated, make a productivity test to determine the nature of the fluids in the formation and the quantity of fluids which might be produced therefrom if the well were completed and eventually produced from that formation. Other objects of this invention will become apparent from the following description in which:

FIGURE 1 is a cross-sectional view of a more-or-less schematic embodiment of an apparatus for performing a combined well stimulation and testing procedure; and FIGURE 2 is a cross-sectional view of a preferred embodiment of an apparatus for performing a drill stem test of a formation which includes a previous but combined formation stimulation step.

From the foregoing, it can be seen that this invention comprises in brief a method and apparatus for obtaining a true productivity test of a formation encountered during the drilling of a well. In this true test, the formation is first stimulated, as by fracturing. It is then tested while the drilling fluid is still in the well, the stimulation and the testing of the formation being conducted while a section of a well opposite that formation is maintained isolated from the main body of the drilling fluid in the well.

Referring now to FIGURE 1 of the drawing for a more detailed description of one embodiment of an apparatus for carrying out our process, an elongated pressure chamber 10 is shown supported by a wire line 11 in a well casing 12. A straddle packer assembly 13 on the lower end of pressure chamber 10 has upper packing element 14 which provides a fluid seal with the casing above casing perforations 15 and lower packer element 16 which provides a fluid seal with the casing below the casing perforations. These packing elements are each typically double cone-type packers with the bases of the cones together and the open ends of the cones oppositely disposed so that they provide packing in both directions. With this construction it will be apparent that the packing elements prevent movement of fluid in both directions so that, when pressure is applied to the isolated section 17 of the well between the packing elements, fluid will be forced through the casing perforations 15 and, when the pressure within the isolated section 17 is less than the pressure in the main body of the fluid within the well casing adjacent the packing elements, the main body of the fluid which is typically drilling mud cannot bypass the packing elements and enter the casing perforations 15 or contaminate the formation adjacent the perforations. It will be apparent that other types of packing units can be employed but cup-type packers, preferably of the double cup type, have been found to be superior in some respects in that no manipulation of the apparatus after it has been lowered into the casing is necessary to set the packers. Packing elements 14 and 16 are connected or bonded to an internal sleeve 18 which surrounds the pressure chamber outlet 19 and forms therewith an annular fluid bypass 21. Pressure above and below the straddle packer assembly 13 is thus equalized, particularly as the apparatus is lowered into and removed from the well. A fluid port 22 laterally through annular fluid bypass 21 connects the pressure chamber outlet with the isolated section 17 of the well between the packing elements 14 and 16. The lower end of the pressure chamber outlet 19 is closed by a plate 23 or the like. Some form of seal such as a spring-actuated ball check valve 24 and a plate check valve 25 are provided to close the lower end of the pressure chamber 10 and hold a quantity of stimulating or treating fluid 26 in the chamber as it is lowered into the well. Combination ball check valve 24 and plate check valve 25 provide in effect a two-directional check valve which first permits displacement of the stimulating treating fluid 26 from the pressure chamber when sufficient pressure is applied to compress spring 27 and, second, permits formation fluids to enter the pressure chamber through peripheral ports 28 when the differential pressure upwardly is sufficient to lift the annular plate 29.

In operation, when it is desired to make a test of a subterranean formation during drilling or otherwise, especially when the well contains extraneous or contaminating liquids, a quantity of a stimulating or treating fluid 26, which is typically a wash fluid or a low-penetrating fracturing fluid, e.g., gelled or viscous oils, water, or a strong mineral acid, is placed in pressure chamber 10. Such low-penetrating fluids are characterized as described in Re. 23,733 by a substantially retarded filtrate rate, as compared to the filtrate rate of indigenous fluids through the pores of the formation. A gas-producing charge 30, such as a slow-burning or non-brisance explosive either as a solid or a liquid which floats on the treating fluid 26, is placed in the upper end of the pressure chamber to provide a propulsive force for expelling the treating fluid from the pressure chamber and injecting it into the formation. This gas-producing charge comprises preferably a deflagrating type of explosive such as black powder, nitromethane, JATO (jet assisted take-off) types of charges or the like which are capable of producing a high thrust for a period of a few seconds. Other types of gas-producing charges suitable for generating a high non-detonating pressure which may be substituted and are satisfactory for propelling the treating fluid from the pressure chamber comprise, for example, ammonium nitrate and an oxidizable organic material and mixtures of nitroguanadine and a hypophosphite. The quantity of treating fluid and of the gas-producing charge can, of course, be varied over a substantial range depending upon the nature of the materials, the pressures desired, the extent of the fracture desired in the formation and the like. At least one barrel and typically as many as ten or more barrels of the treating fluid are used. Sufficient gas-producing charge is used to produce a pressure in the pressure chamber at least as great as the formation fluid pressure and preferably as great as the effective overburden pressure on the formation so that the formation may be fractured. Various means may be provided for initiating the reaction or "detonation" of the gas-producing charge. A percussion cap detonated by an electrical charge transmitted through the wire line 11 may be employed. Preferably, however, the wire line does not have an insulated conductor therein and the cap (not shown) is initiated by a timing mechanism 31 which is initially set, as is well known in the well shooting art, to permit time for lowering the apparatus into the well and spotting the straddle packer assembly 13 at the elevation of the formation or at casing perforations opposite the formation which is to b stimulated and tested. When the pressure chamber is thus charged and lowered to the selected or proper elevation in the well, it is allowed to remain suspended on cable 11 until the timing mechanism 31 initiates gas production as by igniting or "detonating" the gas-producing charge 30. As gas pressure is built up in the pressure chamber by this charge, the stimulating or treating fluid 26 is displaced downwardly first opening the ball check valve 24 and passing thence through the chamber outlet 19, via the port 22, and into the isolated section 17 of the well between the packing elements 14 and 16. In some cases, well wall contamination due to solids on or at the face of a formation prevent the formation from producing into the well. In such cases, a treating fluid such as acid, an oil-water demulsifier, or a wash fluid such as a water solution of a clay dispersant or coagulant is merely injected into this isolated section to destroy the material blocking the rock pores adjacent to the well. In most cases, however, it is desired to provide sufficient treating material and gas-producing charge to displace at least part of the treating material back into the formation. In the preferred embodiment, as indicated above, this treating material is injected back into the formation at a sufficient rate to fracture the formation so that a highly permeable path is provided through the fracture for formation fluids to enter the isolated section of the well after the pressure produced by the charge 30 has been dissipated. In many cases, the treating fluid, as is well known in the art, may contain a suspension of sand or other propping material which is injected into the passages of the formation with the treating fluid and remains there to support the overburden and provide a highly permeable channel to the well from deep in the formation. After the energy of the gas-producing charge has been dissipated and the treating fluid 26 in the high pressure chamber 10 has been displaced into the isolated section or preferably into the formation, the apparatus is allowed to remain temporarily in the well with the straddle packer assembly 13 in position opposite the treated formation to prevent the main body of drilling or other fluid in the well above and below the assembly from entering and contaminating any highly permeable pores or channels produced in the adjacent formation by the stimulation step.

The gases produced by the gas-producing charge are, of course, hot and therefore initially occupy a greater volume than when they are eventually cooled to the temperature of the well fluid in the area. The apparatus is, therefore, left in position until these gases are in a large measure cooled or otherwise condensed in the liquids with which they are in contact. Such dissipation of this gas pressure permits the formation fluids together with part of the injected fluid to enter the pressure chamber through the isolated section of the well, the chamber outlet, and the peripheral ports 28 in the plate check valve 25. The nature of the fluids in the formation opposite the isolated zone 17 can thus be determined. Similarly, other productivity characteristics of the formation such as the producing rate can be ascertained by leaving the apparatus in isolated fluid communication with the treated formation for a given or predetermined period of time. When the apparatus is then removed from the well and the quantity of fluid in the pressure chamber is determined, there is an indication of the contemplated productivity of the formation if the well is finally completed by a similar but generally larger stimulation process in the same formation or zone. These results provide information for the operator so that he can more accurately evaluate the commercial possibilities of the particular formation and determine whether the well should be finally completed in the tested zone, etc. If the test indicates that the stimulated and tested formation will make a commercial well, the operator can of course cease drilling, set casing, perforate, fracture or acidize on a larger scale and generally complete the well in the usual manner.

Generally, as is well known, a productivity test during drilling is performed with the drill pipe in the hole so that the nature and quantity of fluid production from a formation can be determined by producing the fluid into or through an open drill pipe. In the past, however, as indicated previously, these drill stem tests have often indicated an erroneous productivity so that formations which might actually be commercial have been bypassed and sealed off by casing and the like. A preferred type of drill stem testing apparatus, which permits formations under test to be first stimulated before and in combination with the test, is shown in FIGURE 2 and will now be described in detail. In many drill stem tests, a rat hole is first drilled at the bottom of a well into the zone to be tested to provide a seat on which a conical packer can be landed to isolate a lower test section from the main body of the drilling fluid above the packer. Such a single packer apparatus can be employed but since it is generally desirable to apply a high fluid pressure to the isolated section 17 below the packer, a wall-type packer 41, or in some cases two spaced wall-type packers, are preferred. Packers of this type, as it is well known, may be expanded out against the well wall 42 by any of a number of means such as by longitudinal compression obtained by applying the weight of the drill pipe 43 to the top of the packing element as it is supported by the perforated anchor 44 which extends to and rests on the bottom of the well.

The pressure chamber 10' from which the treating fluid is exhausted into the isolated section 17 of the well is located above the packer 41 and either forms a part of the lower end of the drill pipe 43 or is connected to the lower end of the drill pipe. In the preferred embodiment the pressure chamber which is typically larger in diameter than the drill pipe, and may be as long as 50–500 feet or more, has a landing nipple 46 at the top which is in turn connected to the bottom of the drill pipe. This landing nipple has an upper shoulder 47, a recess 48, and a smooth internal bore 49, which are respectively for landing, anchoring, and sealing a combination upper pressure chamber plug and gas-producing cartridge 51 in the upper end of the pressure chamber. A frangible diaphragm 52, preferably dished downward in the center as indicated in FIGURE 2 of the drawing, is inserted at the bottom of the pressure chamber between the lower end of the cylinder wall and the collar 53 on the chamber outlet valve 54. This frangible diaphragm may be metallic or non-metallic depending upon the desired strength, but it is typically steel, aluminum, or the like adapted to withstand a differential pressure of several thousand pounds in the upper direction but to fail with a smaller differential pressure in the downward direction. Since the drill pipe and pressure chamber are lowered into the well empty and since the well is typically full of drilling fluid having specific gravity in the range of about 1–2, it will be apparent that this frangible diaphragm will be required to withhold a differential pressure in the upward direction of about 0.5–1 pound per foot of well depth, or in some extreme cases as much as about 20,000–25,000 pounds per square inch or more. On the other hand, the frangible diaphragm is desirably broken when the differential pressure in the downward direction is much lower. For example, the diaphragm is desirably designed with the center dished downward as indicated so that it ruptures with a minimum differential pressure downward across the diaphragm of about 10–100 pounds per square inch.

The chamber outlet valve may, as indicated in the embodiment shown in FIGURE 1, comprise a two directional check valve but a positive acting valve is preferred. A typical positive acting outlet valve 54 is shown in FIGURE 2. In this embodiment, a central mandrel 55 is connected, via collar 53, to and actuated, i.e., opened and closed, by rotation of the drill pipe and pressure chamber. This mandrel is threaded into an outer sleeve 56, preferably with a left-hand thread 57 and extends through the outer sleeve a distance sufficient to provide room for perforations 58 below the lower end of the sleeve. The mandrel has a lower closure 59 having a diameter greater than the internal diameter of outer sleeve 56 to provide a shoulder 61 which prevents the mandrel being unthreaded from the sleeve. In the open position, the perforations 58 as indicated are below the lower end of the outer sleeve, but when desired, it can be seen that by rotating the drill pipe 43 in the proper direction, e.g., clockwise from the surface, while the sleeve is held by the packer 41 and anchor 44, the perforations can be raised above the packing ring 62 to close the valve and thus isolate a sample of fluid in the pressure chamber and drill pipe.

Considering now the operation of the embodiment of the apparatus shown in FIGURE 2, anchor 44, packer 41, chamber outlet valve 54, pressure chamber 10', landing nipple 46, and in some cases the frangible diaphragm 52, are attached to the lower end of the drill pipe 43 and lowered into the well, usually with the pressure chamber and drill pipe empty. Typically the chamber outlet valve is open and the frangible diaphragm is in place when the apparatus is lowered into the well. In some cases, however, the valve is closed so that the frangible diaphragm is unnecessary. When the bottom of the anchor 44 strikes an obstruction in the well or otherwise contacts the bottom of the well and the weight of the drill pipe is applied, the packer 41 is compressed longitudinally and expanded radially until it forms a seal with the well wall. The treating fluid 26, if not placed in the pressure chamber at the surface, is then pumped into the pressure chamber desirably leaving only sufficient volume in the upper end of the pressure chamber for the gas-producing cartridge 63.

The combination upper pressure chamber plug and gas-producing cartridge 51 are lowered into the well on a cable 11' having an insulated electrical conductor 64 therein. The gas-producing cartridge contains sufficient gas-producing charge 30 as described above to rupture the frangible diaphragm 52 and expel the treating fluid 26 from the pressure chamber into the formation to be treated, i.e., the formation adjacent to the isolated section 17 of the well. A detonating or explosion cap 65 in the upper end of the gas-producing cartridge is electrically connected through flexible conductor 66 with the electrical conductor 64 for igniting or "detonating" the gas-producing charge. A packing 67 on the upper end of the gas-producing cartridge forms a pressure seal with the internal bore 49 of landing nipple 46. The combination upper pressure chamber plug and gas-producing cartridge is supported by head 68 which is larger than and rests on upper shoulder 47 of the landing nipple. The combination upper pressure chamber plug and gas-producing cartridge is held down by the dogs 69 as pressure develops in the pressure chamber. These dogs are urged outwardly by the cone 70 so that they expand into the recess 48 and when raised by pressure in the chamber 10' to contact shoulder 71 hold the gas-producing cartridge in position, i.e., plug the upper end of the pressure chamber. As the cartridge is lowered into the drill pipe, it is supported by the dogs which are rotatably mounted via pins 72 on the crosshead 73 and are larger at the bottom end than the slotted openings 74 in head 68. When the upper head 68 strikes shoulder 47, however, the flexible conductor 66 below the crosshead 73 allows the crosshead and dogs to be lowered causing the dogs to be expanded outwardly as they contact the cone 70. By this means, it can be seen that the combination of the upper pressure chamber plug and gas-producing cartridge 51 forms a plug or seals the upper end of the pressure chamber when pressure is applied in the pressure chamber, but permits removal of the plug merely by lifting the cable 11'.

After the packer 41 has been set isolating a section of the well therebelow from the main body of the drilling or contaminating fluid above the packer and after the pressure chamber has been filled with the stimulating or treating fluid, and after the upper end of the pressure chamber is plugged and the outlet valve 54 opened, the cap 65 is detonated by applying an electrical potential through the conductor 64 to initiate the production of gas in the gas-producing cartridge. As the pressure builds up in this cartridge, its lower frangible end 75 is ruptured and gas pressure is applied to the upper surface of the treating fluid 26. When the pressure in the treating fluid is raised sufficiently to rupture the frangible diaphragm 52 where such a diaphragm is used, this treating fluid is discharged from the pressure chamber through perforations 58 in the outlet valve 54 and thence through the perforated anchor 44 into the isolated section 17 of the well displacing other fluids back into the surrounding formation. The application of additional pressure then forces the treating fluid into the surrounding formations. If, as is the usual case, the treating fluid is injected at a sufficient rate, the selected formation surrounding or opposite the isolated section of the well below the packer 41 is fractured. Continued expansion of the gas from the gas-producing charge displaces the treating fluid back into the formation and extends such fracture or fractures to any desired depth depending upon the quantity of treating fluid, the available energy in the gas-producing charge, the permeability and porosity of the rock in the formation treated, etc.

After the treating fluid has been displaced from the pressure chamber into the surrounding formation, any surplus gas produced by the gas-producing charge also flows into the rocks or is otherwise condensed by the liquids in the well and in the formation. When the energy of charge and the pressure in the pressure chamber has thus been dissipated, the combination upper pressure chamber plug and gas-producing cartridge 51 is removed from the upper end of the pressure chamber by lifting cable 11' to retract dogs 69 from recess 48. The combination upper pressure chamber plug and gas-producing cartridge 51 is then lifted to the surface leaving the drill pipe 43 open and under substantially atmospheric pressure so that any pressure in the treated formation will cause formation fluids to be produced into the well within the isolated section 17 and flow upwardly through the pressure chamber and the drill pipe. In many cases, the pressure within the treated formation is sufficient to cause the formation fluids to flow through the drill pipe to the surface so that a productivity test can be performed. Where the formation pressure is insufficient to lift the well fluids to the surface through the drill pipe, the chamber outlet valve 54 is closed by rotating the drill pipe 43 to the right after a predetermined time interval. The productivity of the treated formation can then be determined by ascertaining the amount of liquid in the drill pipe or pressure chamber when the pressure chamber is lifted to the surface. Other means of recovering the sample and determining the productivity of a test section such as by circulating the sample of produced fluid out of a drill pipe, as is well known in the drill stem testing art, can be employed. As the drill pipe is lifted, packer 41 collapses so that the drill pipe can be removed from the well. At the surface, the stimulating and testing apparatus attached to the lower end of the drill pipe can be removed, the drilling equipment such as drill collars and drill bit attached and the drill pipe can be lowered into the well for further drilling if desired.

From the foregoing, it will be apparent that while a typical drill stem test in many formations might not indicate the true productivity of a formation, we have provided a method of apparatus by which a stimulation process can be employed in the drill stem testing art to obtain a true or representative productivity test. It will also be apparent that while reference has been made to various embodiments of an apparatus suitable for performing the steps of this process, other types of apparatus can be substituted and substantially the same or similar results can be accomplished. This invention should, therefore, be construed not to be limited to the apparatus or to the specific steps described, but should be construed instead to be limited only by the scope of the appended claims.

We claim:

1. In a process for testing the productivity of a formation penetrated by a well containing a contaminating fluid, the improvement comprising the steps of placing in said well at a point near said formation a chamber containing a treating fluid and having a valved outlet in fluid communication with a section of said well opposite said formation, isolating said outlet from the main body of said contaminating fluid, detonating a gas-producing charge in the upper end of said chamber to open said valved outlet and displace said treating fluid from said chamber into said section of said well, then producing well fluid from said formation into said section of said well and thence into said chamber through said valved outlet while maintaining said section of said well isolated from said main body of said contaminating fluid, then withdrawing said chamber from said well.

2. A process according to claim 1 including displacing said treating fluid from said chamber into said isolated section of said well and thence into said formation under sufficient pressure to produce a highly permeable channel from said formation into said isolated section of said well and then producing said well fluid from said formation into said chamber via said channel.

3. A process according to claim 2 in which said treating fluid is displaced into said isolated section of said well and thence into said formation under sufficient pressure to fracture said formation.

4. A process for testing the productivity of a calcareous formation penetrated by a well containing a liquid which includes the steps of placing in said well at a point near said formation a quantity of a strong mineral acid in a chamber having a valved outlet in fluid communication with a section of said well opposite said formation, isolating said outlet from the liquid in said well, displacing said acid from said chamber through said valved outlet into said section of said well with a gas producing charge, then producing well fluids from said formation into said section of said well and thence into said chamber through said valved outlet while maintaining said section of said well isolated from said main body of said liquid, and withdrawing said chamber from said well.

5. A process according to claim 4 in which said acid is a low-penetrating fluid having in comparison to the formation fluid a relatively low filtrate rate through said formation, and is displaced into said isolated section of said well and thence into said formation under sufficient pressure to fracture said formation.

6. A process for testing the productivity of a formation penetrated by a well during drilling and while said well contains drilling fluid under greater pressure at the elevation of said formation than the fluid pressure in said formation including the steps of locating in said well a chamber containing a treating fluid and having a bottom valved outlet at about said elevation, isolating a section of said well, which includes said outlet, from the main body of said drilling fluid, igniting a gas-producing charge in the top of said chamber to displace a treating fluid from said chamber through said outlet into said section of said well, and then, while maintaining said section of said well isolated from said main body of said drilling fluid, producing well fluid from said formation into said section of said well and thence into said chamber through said valved outlet.

7. A process according to claim 6 including the step of removing said chamber containing said well fluid from said well and determining the quantity of well fluid produced thereinto per unit of time said chamber was in fluid communication with said formation as an indication of the productivity of said formation.

8. A process according to claim 6 including displacing said treating fluid from said chamber into said isolated section of said well and thence into said formation under sufficient pressure to produce a highly permeable channel from said formation into said isolated section of said well and then producing said well fluid from said formation into said chamber via said channel.

9. A process according to claim 8 in which said treating fluid is displaced into said isolated section of said well and thence into said formation under sufficient pressure to fracture said formation.

10. A process for testing the productivity of a formation penetrated by a well containing an extraneous liquid which includes the steps of lowering into said well to a point adjacent said formation a string of pipe having a valved outlet, a lower fluid seal in its outlet to exclude said extraneous liquid from said pipe, isolating a section of said well, which is in fluid communication with said outlet, from the remainder of said well to exclude from said section the main body of said extraneous liquid placing a quantity of well treating fluid in said pipe above said lower fluid seal, producing an upper fluid seal, thereby forming a pressure chamber in said pipe above said lower fluid seal and below said upper fluid seal, said pressure chamber enclosing said treating fluid at the bottom and a gas-producing charge at the top, causing said charge to produce gas, opening said lower fluid seal, displacing said treating fluid from said pressure chamber through said outlet into said section of said well, and then removing said upper fluid seal while maintaining said section of said well isolated from said remainder of said well to permit fluid from said formation to enter said pipe.

11. A process according to claim 10 including the steps of closing said outlet after said fluid from said formation has entered said pipe and while maintaining said section of said well isolated from said remainder of said well and then withdrawing said pipe from said well.

12. A process for testing the productivity of a formation penetrated by a well during drilling and while said well contains drilling fluid under greater pressure at the elevation of said formation than the fluid pressure in said formation including the steps of lowering into said well to a point adjacent said formation a conduit having a valved outlet and a lower fluid seal near its bottom end to exclude said drilling fluid from said conduit, forming at least one annular seal in the well annulus between said conduit and the wall of said well to isolate the main body of said drilling fluid above said annular seal from a test section of said well opposite said formation and below said annular seal, placing a quantity of well treating fluid in said conduit, above said lower fluid seal, forming a pressure chamber in said pipe above said lower fluid seal and below an upper fluid seal, said pressure chamber enclosing said treating fluid at the bottom and a gas producing charge at the top, causing said gas charge to produce gas and displace said treating fluid from said pressure chamber through said lower fluid seal and valved outlet into said test section and thence into said formation, then removing said upper fluid seal and reducing the pressure in said chamber while maintaining said annular seal in said well annulus to admit fluid from said formation into said conduit while excluding said main body of said drilling fluid from said section of said well and from said conduit, closing said valved outlet and withdrawing said conduit from said well.

13. A process for testing the productivity of a formation penetrated by a well during drilling and while said well contains drilling fluid under a pressure at the elevation of said formation greater than the pressure of the well fluids in said formation, said process including placing in said well an empty string of pipe having a valved outlet and a frangible lower fluid seal near its outlet to exclude said drilling fluid from said pipe, setting a packer in said well to isolate a section of said well, which includes said outlet, from the main body of said drilling fluid, partially filling said pipe and a formation treating fluid, placing a high pressure gas-producing charge in said pipe above said treating fluid, temporarily plugging said pipe above said charge to form a pressure chamber in said pipe, discharging said gas-producing charge to first destroy said frangible lower fluid seal and then displace said treating fluid from said pressure chamber first into the isolated section of said well and thence into said formation, then, while said packer is still set and while still maintaining said section of said well isolated from said main body of said drilling fluid, producing well fluid from said formation into said section of said well and thence into said pipe, then closing said valved outlet.

14. A process according to claim 13 including unplugging said pipe after said treating fluid has been displaced from said pressure chamber and while maintaining said section of said well isolated from said main body of said drilling fluid so that said well fluid from said formation may pass through said pipe to the surface.

15. A process according to claim 14 including displacing said treating fluid from said pipe into said isolated section of said well and thence into said formation under sufficient pressure to produce a highly permeable channel from said formation into said isolated section of said well and then producing said well fluid from said formation into said pipe via said channel while said packer is still set and while still maintaining said section of said well isolated from said main body of said drilling fluid.

16. A process according to claim 15 in which said treating fluid is displaced into said isolated section of said well and thence into said formation under sufficient pressure to fracture said formation.

17. An apparatus for injecting a treating fluid into an isolated subsurface formation penetrated by a well containing drilling fluid and for subsequently testing the productivity of said formation and sampling the fluid therein while said formation remains isolated from the main body of said drilling fluid, including an elongated pressure chamber, means to lower said pressure chamber into said well, a fluid outlet at the lower end of said pressure chamber, closure means in said outlet for temporarily holding a treating fluid in said pressure chamber, a gas-producing charge in the upper end of said pressure chamber, packer means adjacent said fluid outlet to isolate a section of said well, which includes said outlet, from said main body of said drilling fluid, means to discharge said gas-producing charge and displace said treating fluid from said pressure chamber into said isolated section of said well and into contact with said formation, said packer means being adapted to maintain said section of said well isolated from the remainder of said well, which includes said main body of said drilling fluid, after said treating fluid has been discharged from said pressure chamber and the pressure reduced inside said pressure chamber so that formation fluids can flow into said pressure chamber to the exclusion of said main body of said drilling fluid, valve means to close the lower end of said pressure chamber while said section of said well is still isolated from said remainder of said well so that the productivity of said formation can be tested and a sample of said formation fluid can be enclosed in said pressure chamber when said pressure chamber is removed from said well.

18. An apparatus for treating and testing a formation penetrated by a well including an elongated vertical pipe open at the lower end, means including an upper plug and a lower valve forming a chamber in the lower end of said pipe, a treating fluid in said chamber, a gas-producing charge in said chamber above said treating fluid, packer means adjacent said lower end adapted to be set in said well between said pipe and the wall of said well to isolate a section of said well, which includes said open end, from the remainder of said well, means to discharge said gas-producing charge and displace said treating fluid from said chamber into said isolated section of said well, means to remove said plug from the upper end of said chamber so that well fluids can flow into said chamber and said pipe, said packer means being adapted to maintain said section of said well isolated after said treating fluid has been discharged from said chamber so that a sample of fluid from said formation can flow via said isolated section into said chamber, and means to close said lower valve while said section is still isolated from the remainder of said well so that said sample of said formation fluid can be trapped in said chamber as said pipe and said chamber containing said sample are removed from said well.

19. An apparatus according to claim 18 including a frangible diaphragm in the lower end of said chamber above said lower valve, said diaphragm being adapted to rupture and release said treating fluid from said chamber through said lower valve when the pressure in said chamber is greater than the pressure in said isolated section by at least about 10–100 pounds per square inch.

20. An apparatus for treating and testing a formation penetrated by a well including a drill pipe, an elongated pressure chamber on the lower end of said drill pipe, said pressure chamber forming a container for a formation treating fluid, a fluid outlet at the lower end of said pressure chamber, a frangible diaphragm in said outlet adapted to withstand without rupturing a substantially greater pressure upward than downward, a gas-producing charge in said pressure chamber, a removable plug in the upper end of said pressure chamber initially preventing fluid communication between said pressure chamber and said drill pipe, packer means adjacent said outlet, means to set said packer in said well and isolate a section of said well, which includes said outlet, from the remainder of said well, ignition cap means to discharge said gas-producing charge and displace said treating fluid from said pressure chamber into said isolated section of said well isolated from the remainder of said well, means to remove said plug from said drill pipe and establish fluid communication between said formation and said pipe after discharging said gas-producing charge and while said packer means is still set and is maintaining said section of said well isolated so that said formation will not be contaminated by extraneous fluids in said well before formation fluid can flow into said pressure chamber, a valve in the said fluid outlet, means to close said valve and entrap a sample of said formation fluid in said pressure chamber, and means to unseat said packer means and remove said pressure chamber containing said sample from said well.

References Cited in the file of this patent

UNITED STATES PATENTS

| | | |
|---|---|---|
| 2,227,731 | Lynes | Jan. 7, 1941 |
| 2,280,785 | Boynton | Apr. 28, 1942 |
| 2,696,258 | Greene | Dec. 7, 1954 |
| 2,696,259 | Greene | Dec. 7, 1954 |
| 2,740,478 | Greene | Apr. 3, 1956 |